United States Patent
Tsutsui et al.

(10) Patent No.: US 6,891,427 B2
(45) Date of Patent: May 10, 2005

(54) CHARGE PUMP TYPE POWER SUPPLY CIRCUIT AND DRIVING CIRCUIT FOR DISPLAY DEVICE AND DISPLAY DEVICE USING SUCH POWER SUPPLY CIRCUIT

(75) Inventors: Yusuke Tsutsui, Hashima (JP); Makoto Kitagawa, Gifu (JP); Mitsugu Kobayashi, Nagoya (JP); Hisao Uehara, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/823,328

(22) Filed: Mar. 29, 2001

(65) Prior Publication Data

US 2001/0030571 A1 Oct. 18, 2001

(30) Foreign Application Priority Data

Mar. 31, 2000 (JP) ........................................ 2000-099889

(51) Int. Cl.[7] ................................................. G09G 5/00
(52) U.S. Cl. ........................ 327/537; 327/544; 327/589; 345/211
(58) Field of Search ................................. 327/534–539, 327/544, 530, 589; 345/211, 95, 212

(56) References Cited

U.S. PATENT DOCUMENTS

| | | | | |
|---|---|---|---|---|
| 4,958,151 A | * | 9/1990 | Ushiki et al. ............... | 340/784 |
| 5,790,393 A | * | 8/1998 | Fotouhi ...................... | 327/536 |
| 5,847,702 A | * | 12/1998 | Jung .......................... | 345/211 |
| 5,859,625 A | * | 1/1999 | Hartung et al. .............. | 345/95 |
| 5,859,632 A | * | 1/1999 | Ito ............................. | 345/211 |
| 5,905,404 A | * | 5/1999 | Nagaraj ...................... | 327/589 |
| 5,986,649 A | | 11/1999 | Yamazaki | |
| 6,236,394 B1 | * | 5/2001 | Ikeda ......................... | 345/211 |

FOREIGN PATENT DOCUMENTS

| | | |
|---|---|---|
| EP | WO99/42894 | 8/1999 |
| JP | 002199006 | 11/1998 |
| JP | 10-304653 | 11/1998 |
| WO | WO96/21880 | 7/1996 |

* cited by examiner

Primary Examiner—Dinh T. Le
(74) Attorney, Agent, or Firm—Hogan & Hartson, LLP (57) ABSTRACT

A driving circuit of a display device such as a liquid crystal generates power supply clocks (1 and 2) based on a system clock during the normal display operation which is not a power save mode. The generated power supply clocks are supplied, directly or after inversion, to the switches (SW1 through SW4 (and SW5 through SW8)) in a charge pump type power supply circuit (300) for switching the connection of capacitors (C1 and C2 (and C11 and C12)) in the power supply circuit (300). In this manner, supply voltages VDD2 and VDD3 which function as the driving power supply for a driving circuit (100) and a display panel (200) can be obtained at the power supply circuit (300) by boosting the input voltage Vin. The driving circuit (100) stops supply of the power supply clocks to the power supply circuit (300) when a transition to the power save mode is instructed and a power save control signal generated by a CPU I/F circuit (16) is changed, thereby suspending generation of the supply voltage an consumption of power consumption at the circuit and display panel.

10 Claims, 7 Drawing Sheets

FIG. 7 ated onto a single chip IC with the driving circuit.

CHARGE PUMP TYPE POWER SUPPLY CIRCUIT AND DRIVING CIRCUIT FOR DISPLAY DEVICE AND DISPLAY DEVICE USING SUCH POWER SUPPLY CIRCUIT

BACKGROUND OF THE INVENTION

1. Field of the Invention

The present invention relates to a power supply generating system and in particular to a power supply generating system which can adapt a power save mode useful for, for example, a driving section of a display device.

2. Description of the Related Art

Flat panel display devices such as a liquid crystal and an organic EL display devices are generally thin, lightweight, and consume less power. Because of these characteristics, flat panel display devices are suited for use as display devices for portable devices, such as mobile phones, and have therefore come to be widely employed in many such portable devices.

Figure 1:
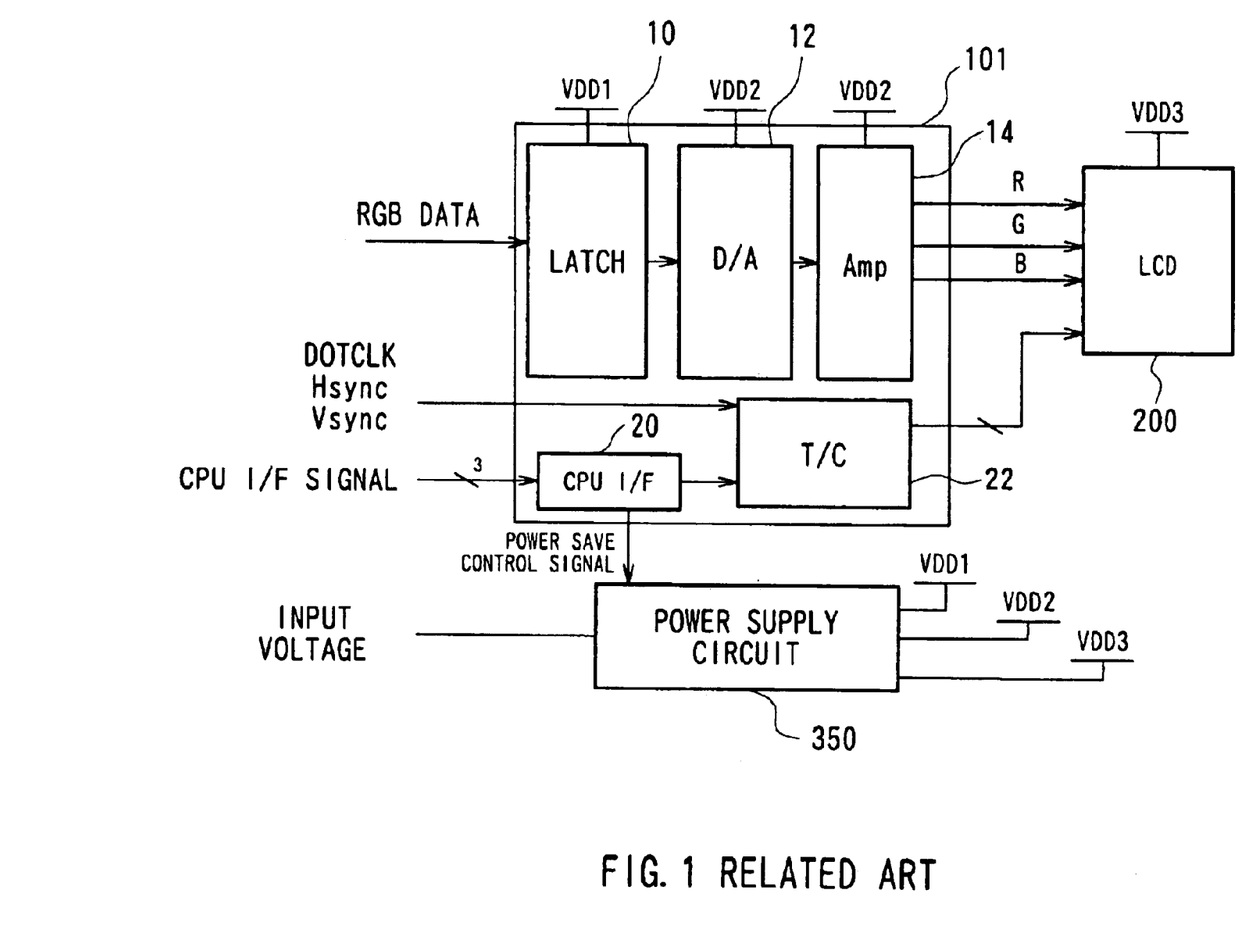
FIG. 1 is a diagram showing a structure of a liquid crystal display device according to a related art.

FIG. 1 shows a structure of a liquid crystal display device used as a display device in a mobile phone. The liquid crystal display device comprises a liquid crystal display (LCD) panel 200 constructed by sealing liquid crystals between a pair of substrates, a driving circuit 101 for driving the LCD panel 200, and a power source circuit 350 for supplying the required supply voltage to the driving circuit 101 and LCD panel 200.

The driving circuit 101 comprises a latch circuit 10 for latching supplied RGB digital data, a D/A converter circuit 12 for converting the latched digital data to analog data, and an amplifier 14 for amplifying the converted analog data and supplying to the liquid crystal display panel 200 R, G, and B analog display data. The driving circuit 101 further comprises a timing controller (T/C) 22 and a CPU interface (I/F) circuit 20 for receiving an instruction from a CPU (not shown) and outputting a control signal in response to the instruction. The T/C 22 generates a timing signal suited for display at the liquid crystal display panel 200 based on timing signals such as a dot clock DOTCLK, a horizontal synchronization signal Hsync, and a vertical synchronization signal Vsync.

The power supply circuit 350 generates a plurality of supply voltages as necessary. The power supply circuit 350 supplies a supply voltage VDD1 having a low voltage to the latch circuit 10 constructed from a CMOS logical circuit suited for driving at a low voltage, a supply voltage VDD2 having a higher voltage to the D/A converter circuit 12 and amplifier 14, and a supply voltage VDD3 having even higher voltage to the LCD panel 200.

Figure 2:
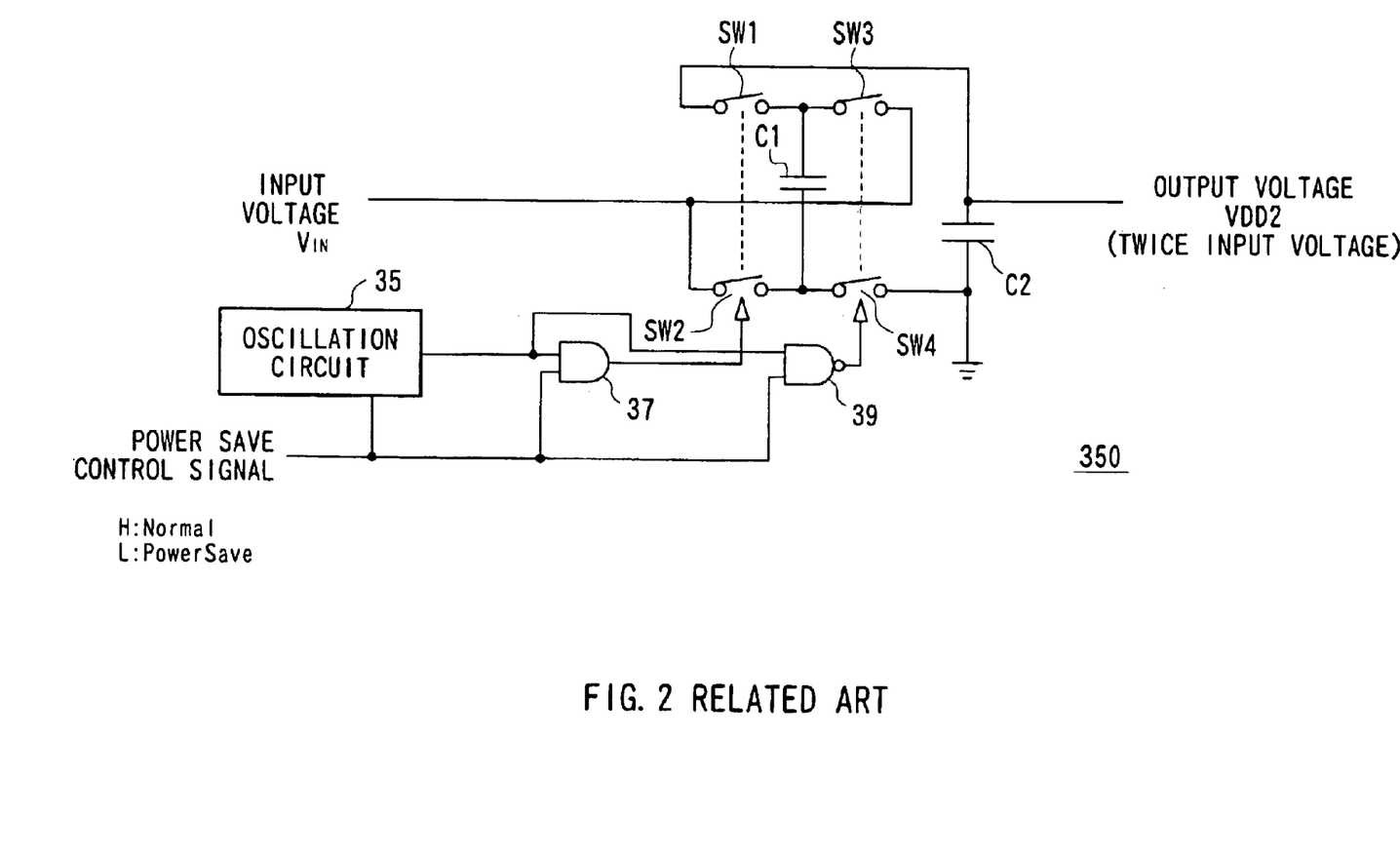
FIG. 2 is a diagram showing a structure of a power supply circuit 350 depicted in FIG. 1.

FIG. 2 shows a structure of a related art power supply circuit 350 which is capable of generating the higher voltage VDD2 having a voltage twice that of the input voltage. The power supply circuit 350 is a charge pump type circuit and comprises two capacitors C1 and C2, switches SW1 through SW4 for switching the supply route of the input voltage to the capacitors, an oscillation circuit 35 for generating a pulse signal for controlling the open/close switching of the switches SW1 through SW4, an AND gate 37, and a NAND gate 39. The oscillation circuit 35 generates a pulse signal having, for example, a duty ratio of 1/2. The pulse signal is supplied to the switches SW1 and SW2 via the AND gate 37 and to the switches SW3 and SW4 via the NAND gate 39 such that the switches SW1 and SW2, and SW3 and SW4 are alternately opened and closed. When switches SW3 and SW4 are closed, the input voltage VIN is applied to the electrode of the capacitor C1 at the upper side of the drawing, and the lower electrode becomes the ground (GND). Thus, the capacitor C1 is charged. At the next timing, the switches SW3 and SW4 are opened and the switches SW1 and SW2 are closed. In this case, the input voltage VIN is applied to the lower electrode of the capacitor C1, the voltage at the upper electrode of the capacitor C1 is boosted to a voltage of twice the input voltage VIN, and the output voltage VDD2 having a voltage twice that of the input voltage VIN is obtained at the output end at the point between the upper electrodes of the capacitor C1 and the capacitor C2.

There is a strong demand for reducing the power consumption in portable instruments such as mobile phones and, therefore, in the display devices for such instruments. In order to satisfy this demand, a power save mode, in which the device power supply is controlled to be turned off in order to reduce the power consumption, is commonly employed.

The display device depicted in FIG. 1 also includes the power save mode. The I/F circuit 20 analyzes a power save control instruction transmitted from a CPU (not shown) and generates a power save control signal. The power save control signal may be, for example, a signal having a high level (H level) during normal operation and a low level (L level) during the power save mode, and is supplied to the oscillation circuit 35 of the power supply circuit 350, to one input terminal of the AND gate 37, and to one input terminal of the NAND gate 39, as shown in FIG. 2.

The oscillation circuit 35 of the power supply circuit 350, which receives a power save control signal of H level during the normal operation, generates a pulse signal. Because the power save control signal at H level is supplied to one input terminal of the AND gate 37 and of the NAND gate 39, a pulse signal having the same phase as the pulse signal from the oscillation circuit 35 is output from the AND gate 37, and a pulse signal having the inverted phase of the pulse signal from the oscillation circuit 35 is output from the NAND gate 39. When the power save control signal becomes L level and power save mode is activated, the oscillation circuit 35 halts operation, the output of the AND gate 37 is fixed at the L level, and the output of the NAND gate 39 is fixed at the H level. Because of this, switching operation between the switches SW1 through SW4 is suspended, the capacitors C1 and C2 are discharged, output voltage is reduced, and thus, the power supply circuit 350 is controlled to be turned off.

As described above, by switching off the supply voltage to the driving circuit 101 and to the LCD panel 200, the power consumption at the driving circuit 101 and at the LCD panel 200 is shut down, and, therefore, it is possible to reduce the power consumption at the display device.

In many cases, the driving circuit 101 is integrated onto a single chip IC. The power supply circuit 350, on the other hand, requires capacitors and an oscillation circuit, and thus, needs to be constructed as a separate circuit external to the driving IC 101.

However, in a portable instrument such as a mobile phone, in addition to the reduction in the power consumption, there is simultaneously a strong demand for reduction of the weight, size, thickness, and cost of the devices. In such an environment, an external circuit such as an oscillation circuit 350 creates a large problem because of the area it occupies and because, in order to adapt a power save mode in the power supply circuit 350, the oscillation circuit 35 must include a power save mode capability.

Therefore, reduction in the complexity and in the size of the oscillation circuit 35 is limited.

SUMMARY OF THE INVENTION

The present invention is conceived to solve the above problem and one of the objects of the present invention is to realize a power supply such as, for example, a power supply circuit for a display device, which can effectively adapt a power save mode while having a simple structure.

In order to achieve the above object, the present invention is characterized in the following.

According to one aspect of the present invention, there is provided a charge pump type power supply circuit comprising a plurality of switches and a plurality of capacitors, wherein a supply voltage is generated by switch controlling the plurality of switches and boosting the input voltage based on a power supply clock produced by an integrated circuit using a predetermined system clock, the integrated circuit being operated using the system clock.

According to another aspect of the present invention, there is provided a driving apparatus for a display device comprising a driving circuit for generating a signal to allow a display section to display, the driving circuit being operated using a predetermined system clock; and a charge pump type power supply circuit for generating a supply voltage for a display device by boosting the input voltage to a voltage of n times or −n times the input voltage, the power supply circuit including a plurality of switches and a plurality of capacitors, wherein the driving circuit further generates a power supply clock using the system clock, and the power supply circuit generates the supply voltage by switch controlling the plurality of switches based on the power supply clock. Here, n is an integer equal to or greater than 1.

In this manner, by constructing a power supply circuit so that the power supply circuit generates the power supply using a power supply clock generated by an integrated circuit such as a driving circuit using a system clock, it is not necessary to separately provide an oscillation circuit within the power supply circuit. Moreover, because an integrated circuit is, in many cases, operated using a system clock such as a built-in clock or an external clock, by using such a system clock, a power supply clock can be generated with a simple and easy-to-be-integrated structure.

According to another aspect of the present invention, in the power supply circuit or in the driving circuit, the driving circuit suspends the generation of the power supply clock based on the power save control instruction and the power supply circuit suspends the generation of the supply voltage in response to the suspension of the supply of the power supply clock.

Because the power supply circuit controls switching using the supplied power supply clock, by suspending the supply of the power supply clock, generation of the supply voltage at the power supply circuit can be suspended, and, thus, the apparatus can adapt a power save mode with a simple structure.

According to another aspect of the present invention, there is provided a display device including a display section and a driving apparatus for driving the display section, wherein the driving circuit comprises a driving circuit for generating a signal to allow the display section to display, the driving circuit operated using a predetermined system clock; and a charge pump type power supply circuit for generating a supply voltage for the display device by boosting the input voltage to a voltage n times or (−n) times the input voltage, the power supply circuit including a plurality of switches and a plurality of capacitors, wherein the driving circuit further generates a power supply clock using the system clock and suspends the generation of the power supply clock based on a power save control instruction, and the power supply circuit generates the supply voltage by switch controlling the plurality of switches based on the power supply clock and suspends the generation of the supply voltage in response to the suspension of the supply of the power supply clock.

DESCRIPTION OF THE PREFERRED EMBODIMENT

The preferred embodiment of the present invention (referred to as "embodiment" hereinafter) will be described below with reference to the drawings.

Figure 3:
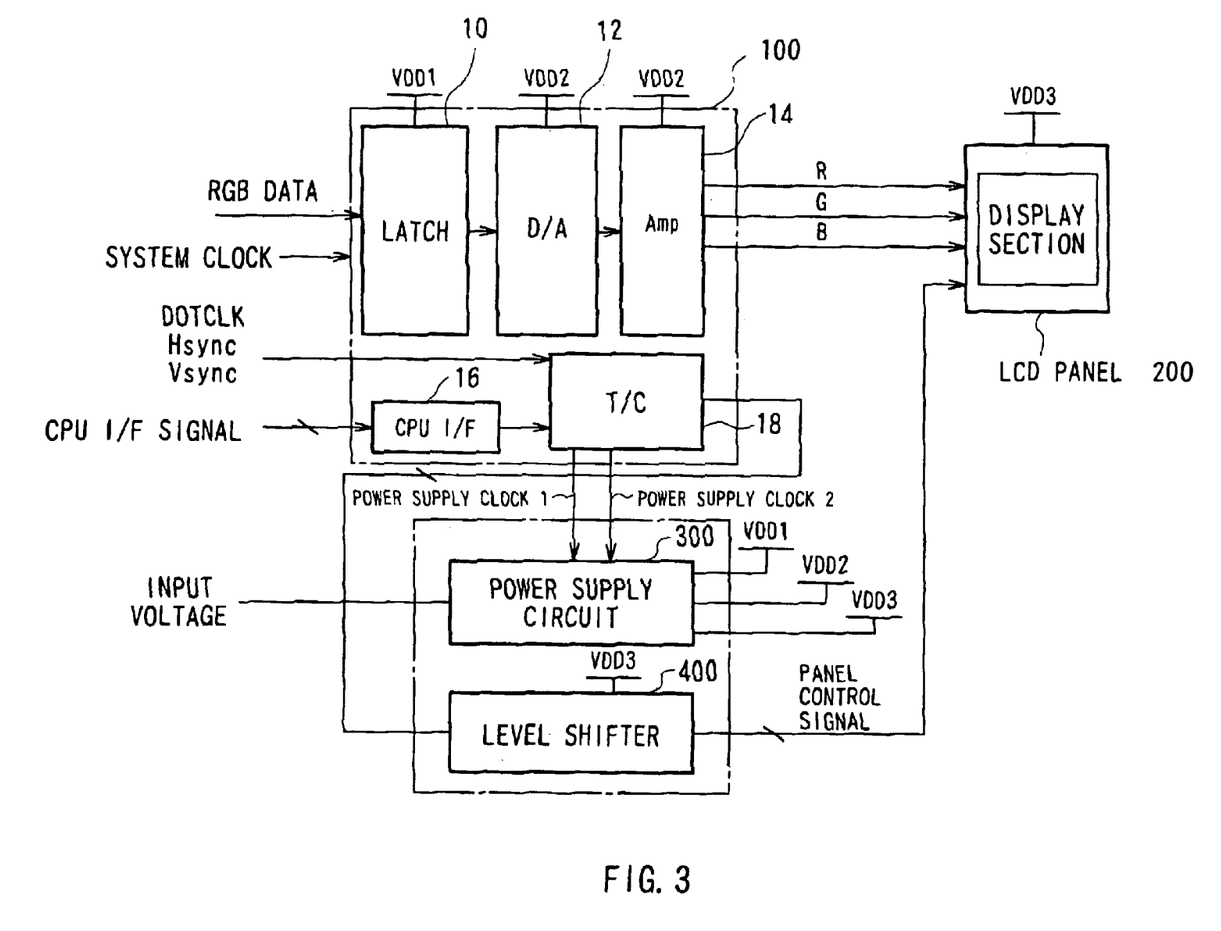
FIG. 3 is a diagram showing a structure of a display device according to a preferred embodiment of the present invention.

FIG. 3 schematically shows the structure of the display device with a power save mode according to the embodiment of the present invention. The display device is a flat panel display device such as, for example, an LCD of a mobile phone, and comprises a display panel (referred to as LCD panel hereinafter) 200, and a driving circuit 100. The display device further comprises a level shifter 400 for shifting the level of the panel control signal produced at the driving circuit 100 for display at the LCD panel 200 to a level sufficient to drive each pixel at the LCD panel 200 and a power supply circuit 300 for supplying supply voltages (for example, VDD1, VDD2, and VDD3) to the driving circuit 100, level shifter 400, and the LCD panel 200, which acts as the operation voltage for these components.

The driving circuit 100 comprises a latch circuit 10, a D/A converter circuit 12, an amplifier 14, and a CPU interface (I/F) circuit 16 and a timing controller (T/C) 18, similar to FIG. 1.

The I/F circuit 16 receives and analyzes an instruction transmitted from a CPU (not shown) and outputs a control signal in response to the instruction. The instructions transmitted from the CPU may include adjustment instructions for the display position within the display panel and contract adjustment instructions, in addition to the power save control instruction. These control instructions are represented in digital control data having a predetermined number of bits. The I/F circuit 16 captures the digital control data and generates a control signal (at least the power save control signal) based on the control data.

The T/C 18 generates a panel control signal for driving the LCD panel 200 based on timing signals such as a dot clock DOTCLK (for example, a system clock), a horizontal synchronization signal Hsync, and a vertical synchronization signal Vsync. The panel control signal produced within the IC is supplied to the level shifter 400, whereby the signal level is shifted to a level sufficient to drive the LCD panel and wherefrom the signal is supplied to the LCD panel 200. The T/C 18 further comprises a power supply clock generating circuit, described below, for generating power supply clocks (power supply clocks 1 and 2 in the embodiment) in response to the power save control signal supplied from the I/F circuit 16, and supplies the generated clock to the power supply circuit 300.

Figure 4A:
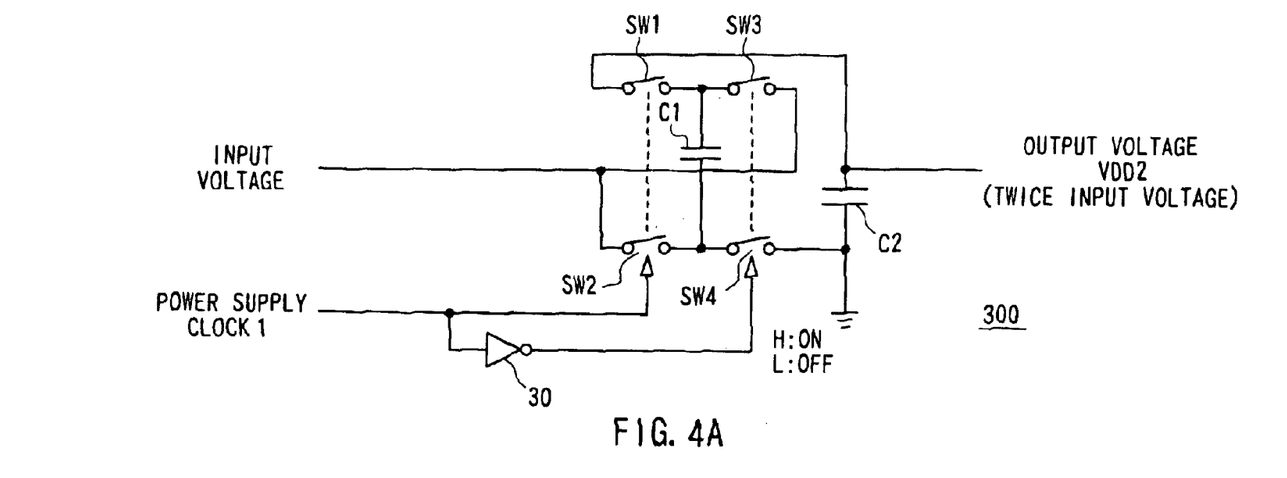
FIGS. 4A and 4B are diagrams showing structures in a charge pump type power supply circuit for a display device according to the embodiment of the present invention.
Figure 4B:
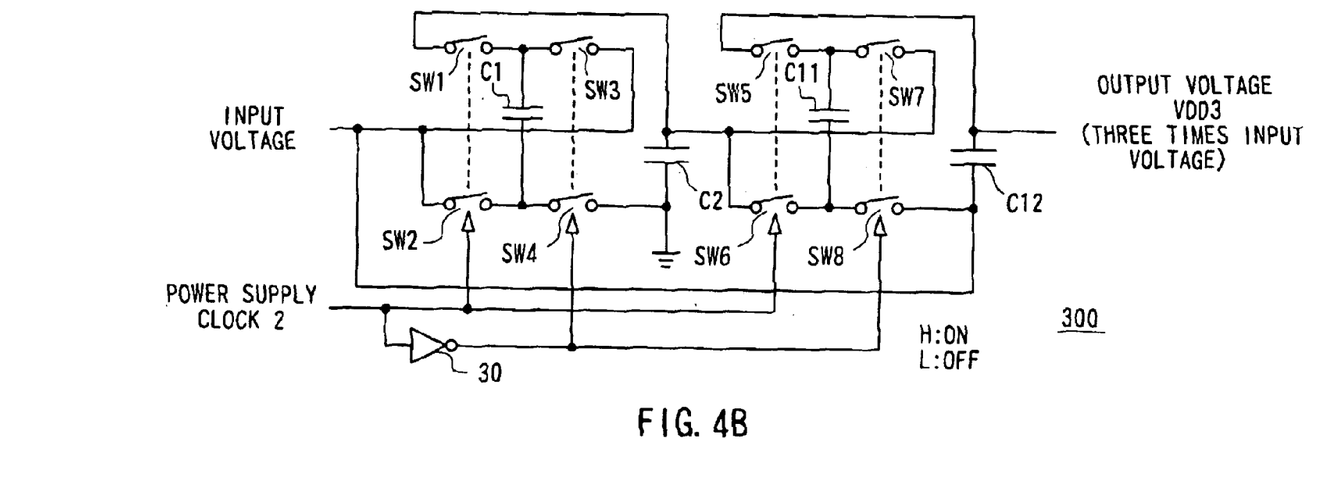

FIGS. 4A and 4B show the structures in a power supply circuit 300 according to an example of the embodiment of the present invention. The power supply circuit 300 shown in these drawings is a charge pump type power supply circuit with a power save mode. Of the power supply circuits 300, FIG. 4A shows the circuit for generating the supply voltage VDD2 and FIG. 4B shows the circuit for generating the supply voltage VDD3. Both charge pump type power supply circuits are capable of generating output voltages VDD2 and VDD3 each having a voltage of n times (here, n=2, 3) the input voltage Vin based on the power supply clocks (1 and 2) supplied from the driving circuit 100, and neither circuit requires an oscillation circuit 35.

The circuit shown in FIG. 4A includes two capacitors C1 and C2, switches SW1 through SW4, and an inverter 30 for inverting the input signal to the switches SW3 and SW4. The circuit shown in FIG. 4A generates an output voltage VDD2 having a voltage twice the input voltage Vin by alternately switch controlling the switches SW1 and SW2, and SW3 and SW4, using the power supply clock 1 from the driving circuit 100.

Sections of the circuit shown in FIG. 4B are similar to those of the circuit shown in FIG. 4A, with switches SW5 through SW8 and capacitors C11 and C22 provided at the output side of the circuit structure shown in FIG. 4A. The power supply clock 2 from the driving circuit 100 is applied to switches SW1, SW2, SW5, and SW6 without inversion and to switches SW3, SW4, SW7, and SW8 with an inversion at the inverter 30. The switches SW1 and SW2 and SW3 and SW4 are alternately switch controlled by the power supply clock 2 to generate a voltage of twice the input voltage between the capacitors C1 and C2. Similarly, the switches SW5 and SW6 and SW7 and SW8 are switch controlled to further boost the generated voltage equivalent to twice the input voltage and to generate a voltage VDD3 having a voltage of three times the input voltage at the output end at the point between the capacitors C11 and C12.

The power supply circuit 300 is not limited to a structure for boosting the input voltage by a positive factor such as 2 or 3, but can be a structure for inverting and boosting the input voltage by a negative factor of −n (for example, −2 or −3). In order to have a power supply circuit with negative boosting factors, the structure of the circuit can be changed with some changes in the connection relation of the switches SW1 through SW4 and SW5 through SW8 with respect to the capacitors. Switching control of the switches SW1 through SW4 and SW5 through SW8 can be performed using the power supply clock, as in the circuits shown in FIGS. 4A and 4B.

Figure 5:
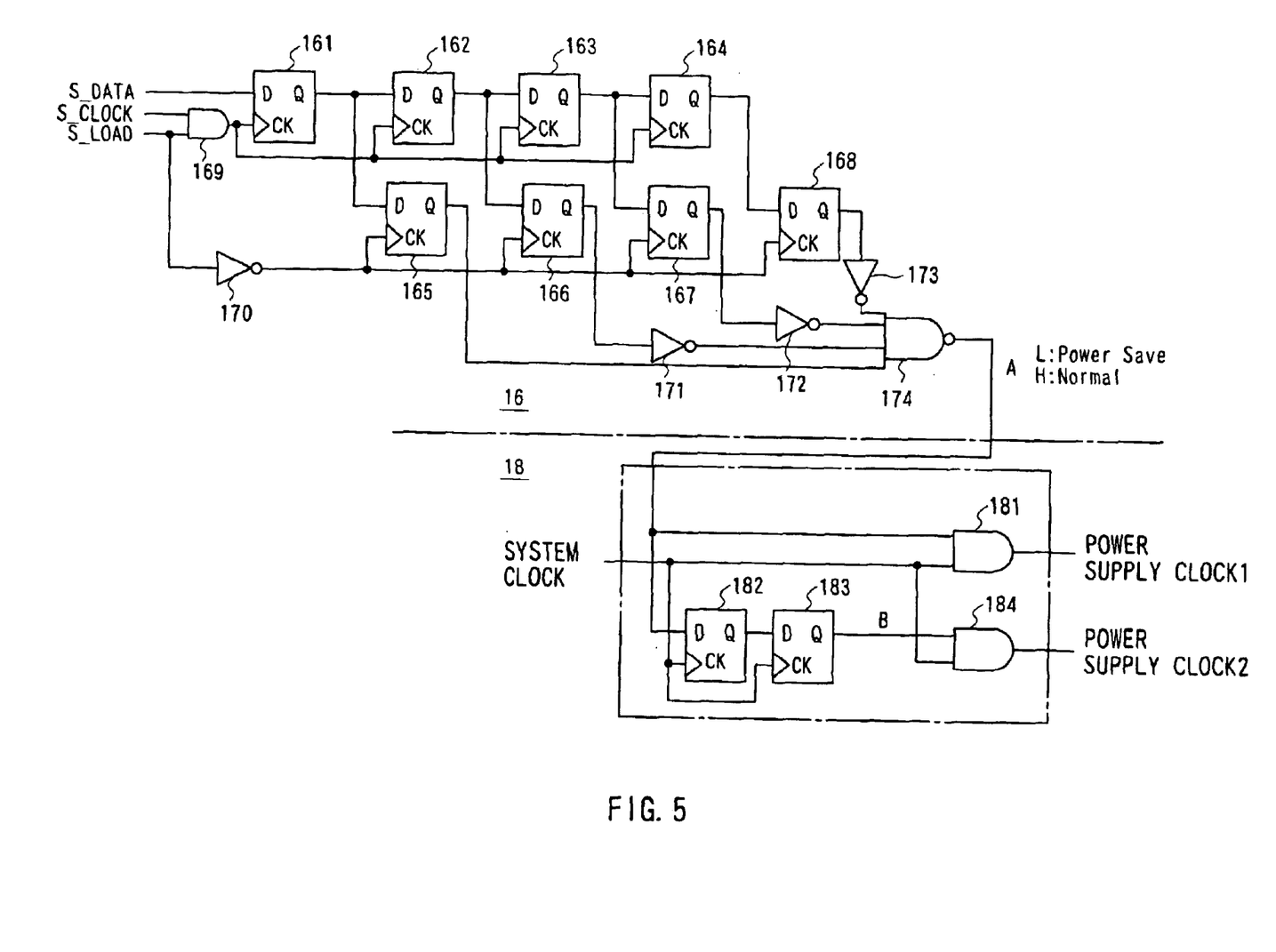
FIG. 5 is a diagram showing the structure of a CPU interface circuit and a power supply clock producing circuit within the timing controller of the display device according to the embodiment of the present invention.
Figure 6:
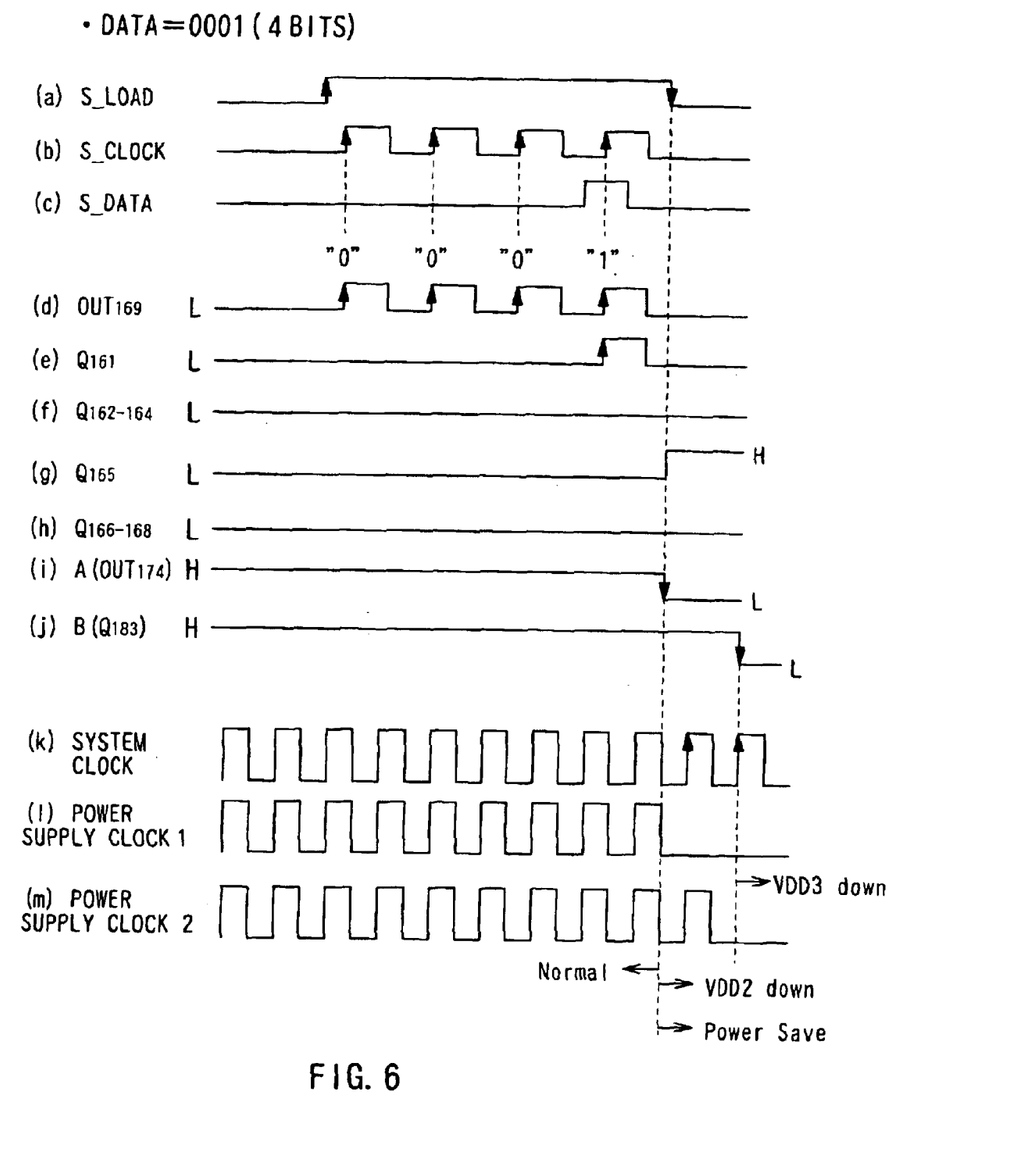
FIG. 6 is a timing chart showing the operation of the driving section for a display device according to the embodiment of the present invention.

A power supply system with a power save mode according to the example embodiment of the present invention will now be described with reference to the FIGS. 5 and 6. FIG. 5 shows a portion of the structure of the I/F circuit 16 and T/C 18 of the driving circuit 100. FIG. 6 shows the operation of the power supply system in the embodiment.

The I/F circuit 16 comprises an AND gate 169, flip-flops (F/F) 161 through 168, inverters 170 through 173, and a NAND gate 174. When the load signal (FIG. 6($a$): S-LOAD) transmitted from the CPU becomes H level, the I/F circuit 16 captures the control data (FIG. 6($c$): S-DATA) at the rise of the clock (FIG. 6($b$): S-CLOCK) supplied from the CPU. In the following description, an example is shown in which the control data is comprised of 4 bits and a control data of "0001" represents transition to the power save mode.

In FIG. 5, the clock terminals CK of the F/Fs 161 through 164 of the I/F circuit 16 are connected to the output of the AND gate 169. The F/Fs 161 through 164 receive the AND output $OUT_{169}$ (FIG. 6($d$)) between the clock (S-CLOCK) and load signal (S-LOAD) as the clock, sequentially capture the serial control data (S-DATA) supplied to the D terminals, and output these data from the Q terminals. The F/Fs 165 through 168 receive the inverted signal of the load signal (S-LOAD) output from the inverter 170 at their respective clock terminal CK, capture the Q outputs from F/Fs 161 through 164 at corresponding D terminals at the fall of the load signal, and output the data from the Q terminals.

Each of the F/Fs 161 through 164 captures the control data "0001" shown in FIG. 6($c$) at the rise of the output $OUT_{169}$ shown in FIG. 6($d$). Because of this, the Q outputs ($Q_{162}$ through $Q_{164}$) of the F/Fs 162 through 164 maintains L level at all time during this period. The Q output ($Q_{161}$) of the F/F 161, on the other hand, changes from L level to H level at the fourth rise of the clock (S-CLOCK).

Because the F/F 165 captures the Q output ($Q_{161}$) of the F/F 161 at the fall of the load signal (S-LOAD) shown in FIG. 6($a$), the Q output ($Q_{165}$) from the F/F 165 changes from L level to H level at the fall of the load signal (S-LOAD) as shown in FIG. 6($g$). As described above, because L level Q outputs of the F/Fs 162 through 164 are continually supplied to the D terminals of the F/Fs 166 through 168, each of the Q outputs ($Q_{166}$ through $Q_{168}$) remain at L level, even when the load signal (S-LOAD) falls, as shown in FIG. 6($h$).

Q output ($Q_{165}$) from the F/F 165 and inverted outputs obtained by inverting the Q outputs ($Q_{166}$ through $Q_{168}$) from the F/Fs 166 through 168, inverted at the inverters 171 through 173, are supplied to the NAND gate 174. Thus, as shown in FIG. 6($i$), an L level signal is output from the NAND gate 174 when the level of the Q output ($Q_{165}$) and the levels of the inverted Q outputs ($Q_{166}$ through $Q_{168}$) are both at H level. In other words, a power save control signal A ($OUT_{174}$) is output from the NAND gate 174 which changes to L level at the fall of the load signal only when the control data (S-DATA) supplied during the H level period of the load signal (S-LOAD) is "0001" (power save mode).

The power save mode control signal A output from the I/F circuit 16 is supplied to the power supply clock generating circuit 180 provided within the T/C 18. The circuit 180 generates power supply clocks (power supply clock 1 and power supply clock 2) in response to a power save control signal, using a system clock which is separately produced and is used as an operation clock by the driving circuit etc., and outputs the power supply clocks to the power supply circuit 300.

In the present example, the power supply clock generating circuit 180 includes a producing section for power supply clock 1 and a producing section for power supply clock 2. The producing section for power supply clock 1 includes an AND gate 181 and the producing section for power supply clock 2 includes two-step flip-flops 182 and 183 which construct a delay circuit and an AND gate 184. The power supply clock generating circuit includes two power supply clock producing sections because, when transitioning into the power save mode, the power supply circuit for generating the voltage VDD3 is controlled to be turned off after the off-control of the power supply circuit for generating the voltage VDD2, as will be described below. This is done by adjusting the timing for the suspension of the output of the power supply clocks to be supplied to each of the power supply circuits, for VDD2 and for VDD3. If there is no need for shifting the off timing for VDD2 and VDD3, the power supply clock 1 can be supplied to all the power supply circuits. In such a case, the power supply clock producing circuit 180 can be constructed from an AND gate 181 for outputting the power supply clock 1.

The power save control signal A output from the I/F circuit 16 is supplied to one input end of the AND gate 181 in the producing section for power supply clock 1 and a system clock such as the system clock shown in FIG. 6(j) is supplied to the other input end of the AND gate 181. Thus, the AND gate 181 outputs the system clock (FIG. 6(j)) as the power supply clock 1 during the period when the power save control signal A is at H level, that is, during the normal operation, as shown in FIG. 6(k). In the power save mode, that is, when the power save control signal A becomes L level by the instruction to transition into the power save mode, the output of the power supply clock 1 is prohibited (here, the clock output is fixed to L level).

In the producing section for power supply clock 2, the system clock shown in FIG. 6(k) is supplied to the clock terminals CK of the F/Fs 182 and 183, and the power save control signal A is input to the D terminal of the first F/F 182. Thus, after the power save transition is instructed and the power save control signal A becomes L level as shown in FIG. 6(i), the F/F 182 captures the L level from its D terminal at the first rise of the system clock, and outputs the data from the Q terminal. The F/F 183 captures the Q output (L level) of the F/F 182 from its D terminal at the next rise of the system clock and outputs the data from the Q terminal.

Thus, as shown in FIG. 6(j), the Q output of the F/F 183 ($Q_{183}$) becomes L level two system clock cycles after the power save control signal A falls to L level.

The Q output of the second F/F 183 ($Q_{183}$) is supplied to one input end of the AND gate 184 and the system clock is supplied to the other input end. The logical product of these is output to the power supply circuit for VDD3 shown in FIG. 4B as the power supply clock 2. In other words, as shown in FIG. 6(m), during normal operation, the system clock is output from the AND gate 184, similar to the power supply clock 1. After the device transitions into the power save mode, the output of the power supply clock 2 becomes L level two system clock cycles later than the power supply clock 1.

The operation of the power supply circuit 300 according to the present embodiment of the present invention will now be described. In the power supply circuit for VDD2 shown in FIG. 4A, during the normal operation, the power supply clock 1 output from the power supply clock generating circuit 180 of the T/C 18 is applied to the switches SW1 and SW2 without inversion and to the switches SW3 and SW4 with an inversion at the inverter 30. Because of this, the switches SW1 and SW2, and SW3 and SW4 are switch controlled to alternately open and close in response to the inversion of the power supply clock 1. Thus, the switches SW1 and SW2 are first opened while the switches SW3 and SW4 are closed, to apply the input voltage Vin to the upper electrode of the capacitor C1 and GND to the lower electrode of the capacitor C1. Then, the switches SW1 and SW2 are closed and the switches SW3 and SW4 are opened, to thereby apply the input voltage Vin to the lower electrode of the capacitor C1, with the result that the voltage at the upper electrode of the capacitor C1 is boosted to a voltage twice that of the input voltage Vin. By repeating this operation, an output voltage VDD2 having twice the input voltage Vin can be obtained from the output end provided between the upper electrode of capacitor C1 and the capacitor C2.

In the power supply circuit for VDD3 shown in FIG. 4B, during normal operation, the switches SW1, SW2, SW5, and SW6 and the switches SW3, SW4, SW7, and SW8 are alternately switch controlled by a power supply clock 2 output from the power supply clock generating circuit 180. In this manner, a voltage twice that of the input voltage is output between the upper electrode of the capacitor C1 and capacitor C2, similar to the circuit for VDD2, and, furthermore, an output voltage VDD3 having a voltage of three times the input voltage can be obtained at the output end provided at the point between the electrode of the capacitor C11 at the upper side of the drawing and the upper electrode of the capacitor C12 with the input voltage Vin applied to the electrode of the capacitor C12 at the lower side of the drawing, by similarly employing the switches SW5 through SW8 and capacitors C11 and C12.

As described, during the normal operation, by using the power supply clocks 1 and 2 supplied from the T/C 18 to alternately open and close the switches SW1 through SW4 and SW5 through SW8, the power supply circuit 300 of the embodiment is capable of producing output voltages VDD2 and VDD3. In contrast to the power supply circuit 350 in the related art shown in FIG. 2, no oscillation circuit 35 is required. During the power save mode, because the power supply clock 1 is first fixed at L level, switches SW1 and SW2 are opened and remain opened, and SW3 and SW4 are closed and remain closed, and thus, the voltage output (VDD2) from the power supply circuit 300 is suspended. Thus, when the device transitions into the power save mode, because the operation voltage, VDD2, becomes 0, the operations of the D/A converter circuit 12 and amplifier 14 in the driving circuit 100 are suspended because they use VDD2 as their operation power voltage, ensuring reduction in the power consumption at these circuits.

The power supply clock 2 becomes L level slightly later than the power supply clock 1 due to the delay by the F/Fs 182 and 183 shown in FIG. 5. At the power supply circuit for VDD3, when the power supply clock 2 is fixed at L level, the switches SW1, SW2, SW5 and SW6 are opened and remain opened while, on the other hand, switches SW3, SW4, SW7, and SW8 are closed and remain closed. As a result, the voltage output (VDD3) from the power supply circuit is suspended. The supply voltage VDD3 is supplied to the level shifter 400 and to the LCD panel 200 as their operation power supply, as shown in FIG. 3. When VDD3 is controlled to be turned off, the operation of the level shifter 400 is suspended, as is supply of the panel control signal to the LCD panel 200. Consequently, the power consumption at the level shifter 400 becomes zero, the display operation at the LCD panel 200 is completely stopped, and no power is consumed by the LCD panel 200. As described, in the present embodiment, the power supply can be controlled to be turned off during the power save mode, and the power consumption as the display device can be reliably reduced.

The circuit 180 for generating the power supply clock only during the normal operation can be constructed, as shown in FIG. 5, from only an AND gate for taking the logical product between the power save control signal and the system clock, for the power supply clock 1, and an AND gate and a delay circuit such as F/Fs for the power supply clock 2. These circuits can easily be built into the driving circuit IC (100) or the like, requiring only a small area.

Moreover, because the power supply circuit 350 does not require an oscillation circuit 35, the components of the power supply circuit 300 other than the capacitors C1, C2, C11, and C12 can be created within the same IC as the driving circuit. It is also possible to create these circuits on the substrate of the LCD panel 200 using a polycrystalline silicon thin film transistor or the like, and, thus, a driving apparatus for a display device with a power supply circuit and a driving circuit (including a one-chip driving IC and built-in circuit in a case where a part of driver circuit is built into the LCD panel 200) with a simple structure can be realized in a small area.

Figure 7:
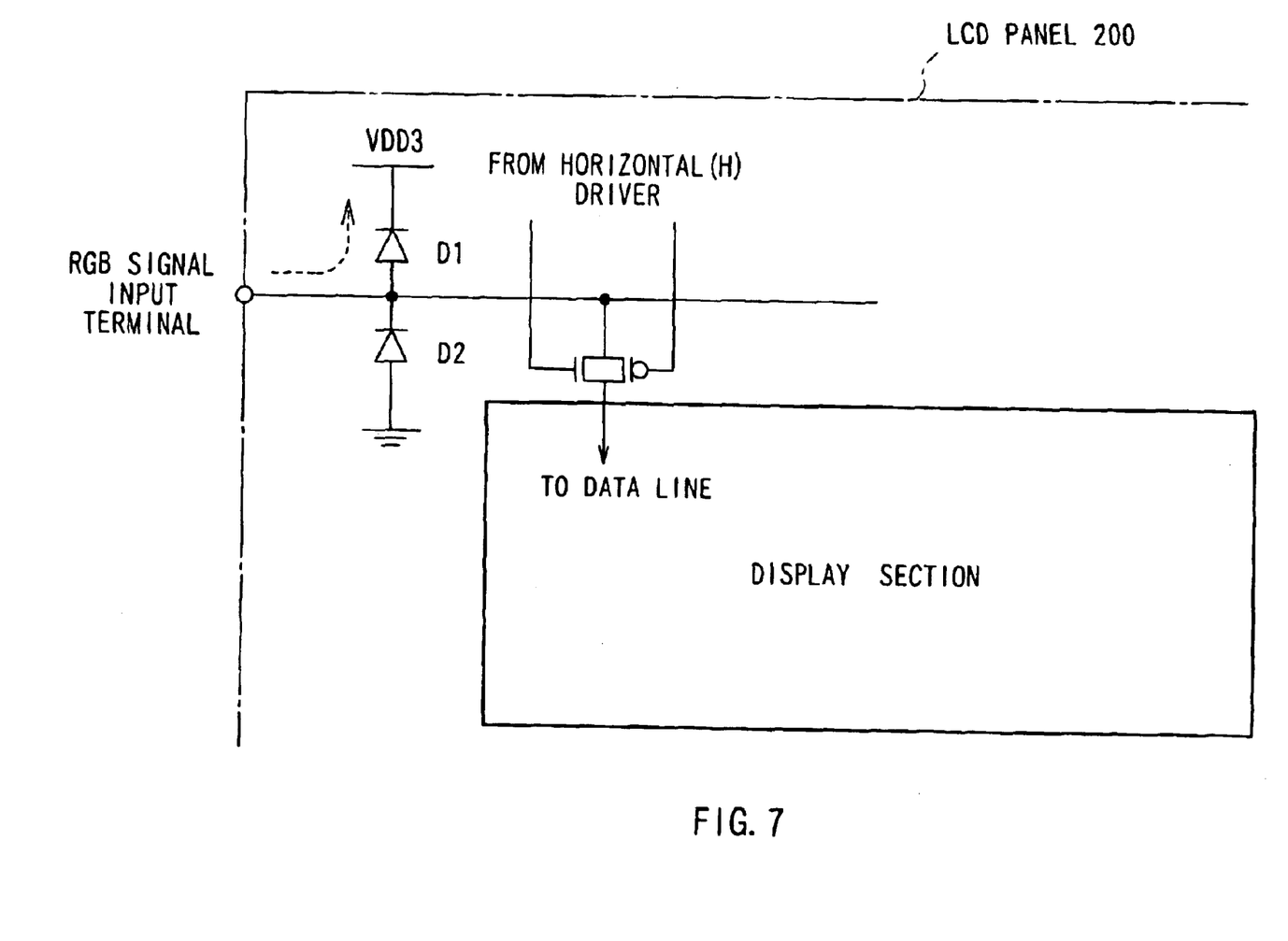
FIG. 7 is a diagram showing the structure of the input section of the LCD panel 200 depicted in FIG. 3.

The purpose of delaying the suspension of the power supply clock 2 for VDD3 beyond the suspension of the power supply clock 1 for VDD2 at the power save mode will now be described. There are many cases where a circuit element, such as a protection circuit or the like, is created on the LCD panel 200 as shown in FIG. 7. For an active matrix type LCD using a thin film transistor (TFT), for example, especially p-SiTFT in which the active layer is constructed from polycrystalline silicon (p-Si), for each pixel at the panel display section, it is common to place a portion of the driving circuit for driving each pixel and the protection circuit or the like at the periphery of the display section of the LCD panel 200 using p-SiTFT with the pixel section TFT.

The protection circuit depicted in FIG. 7 is for preventing the inner circuit from being damaged due to excessive voltage at the signal input line for receiving the analog R, G, and B display signals output from the amplifier 14 of the driving circuit 100, with respect to the supply voltage VDD3 from the power supply circuit 300. This protection circuit is constructed at the panel 200 with the pixel TFT and driver TFT near the input end section of the panel, and comprises a diode D1 placed between the power supply (VDD3) and the input line in reverse direction and a diode D2 placed between the input line and the ground in the reverse direction. When the voltage at the input line exceeds the voltage VDD3, the diode D1 is turned on and the increase in the voltage at the input line is prevented.

When such a protection circuit is formed and the device transitions into a power save mode, and the voltage VDD3 falls before the supply voltage VDD2 which acts as the supply voltage for the R, G, and B display signals, a potential difference is produced in the forward direction of the diode D1. When an electric current flows from the signal input line into the power supply (VDD3) with the voltage reduced, it may cause the LCD panel 200 to operate in an irregular fashion. When the panel 200 has a built-in circuit, this type of erroneous operation can be prevented by adjusting the power supply with a lower voltage before the power supply with a higher voltage when controlling the supply voltages to be turned off.

In the present invention, the display device is not limited to a liquid crystal display device as described in the above example embodiment, and the same advantages can be obtained for other flat panel display devices such as, for example, an organic EL display device. In a display device such as a liquid crystal display device, the driving apparatus is operated according to some kind of system clock for display. By using this clock, power supply clocks can be produced during the normal display by a simple structure. When the device does not perform a display operation, no clock is required by the driving circuit. By configuring the device such that the power supply clock is fixed at a fixed level, that is by suspending the generation of the power supply clock, a power save mode can be realized without adversely affecting the display function.

The power supply clock generating circuit 180 can output the actual system clock as the power supply clock during the normal operation period as described above, or a clock having an identical frequency to the system clock but having different amplitude and/or a pulse width based on the ratio of the capacitors C1 and C2 or the like in the power supply circuit 300 can be output. Also, it is possible to employ a structure where a clock having an optimal frequency for the power supply circuit 300 is generated considering the capacitance values of the capacitors C1 and C2, based on the system clock during the normal operation.

The recovery from the power save mode to the normal operation can be realized by, for example, the I/F circuit analyzing control data when the control data transmitted from the CPU represents a predetermined normal operation instruction for the load signal of FIG. 6(a) to become H level, and returning the power save control signal to H level.

In the example embodiment, the power save control instruction is supplied from the CPU and the I/F circuit 16 generates a power save control signal by analyzing the power save control instruction. However, it is also possible the power save control signal to be directly supplied to the T/C 18 by providing a separate switch and switching the switch by a device user or the like. It is also possible to construct a structure wherein the power save can be instructed both from the CPU and by a device user through a switch.

As described, according to the present invention, power supply clocks are generated by an integrated circuit such as a driving circuit etc. of the display device using a predetermined system clock. By using the power supply clock to switch and control the switches at the charge pump type power supply circuit, provision of an oscillation circuit at the power supply circuit will be no longer necessary, and, thus, supply voltage can be generated with a very simple structure.

Because the generation of the power supply at the power supply circuit can be suspended by suspending the generation of the output of the power supply clock at the integrated circuit, a power supply circuit and a driving apparatus with a power save mode can be realized by configuring the apparatus to suspend the generation of the power supply clock in response to a power save control instruction, and, thus, the power supply circuit and driving apparatus with a very simple structure can adapt a power save mode.

What is claimed is:

1. A charge pump type power supply circuit comprising:
   a first capacitor, a second capacitor and an output coupled to the second capacitor;
   a first switch, wherein the first switch connects a first terminal of the first capacitor to either of an input voltage or a first terminal of the second capacitor;
   a second switch, wherein the second switch connects a second terminal of the first capacitor to either of a second terminal of the second capacitor or the input voltage;
   a control circuit controlling switching of
   the first switch to allow the first switch to alternatively connect the first terminal of the first capacitor to the input voltage or to the first terminal of the second capacitor, and further controlling switching of
the second switch to allow the second switch to alternatively connect the second terminal of the first capacitor to the input voltage or to the second terminal of the second capacitor, two power supply clocks generated in accordance with a system clock and coupled to be provided to the first switch and the second switch, wherein the system clock is provided from outside of the charge pump type power supply circuit and is used for operation other than operating the power supply clock within the charge pump power supply circuit; and the control circuit suspends generation of the two power supply clocks in response to a power save control instruction, suspension of generation of the two power supply clocks occurring one by one.

2. A charge pump type power supply circuit according to claim 1, wherein said charge pump type power supply circuit includes means for selectively providing a power save control instruction;

said control circuit suspends the generation of the two power supply clocks in response to the power save control instruction; and said control circuit suspends the generation of said boosted voltage in response to the suspension of the two power supply clocks.

3. A charge pump type power supply circuit according to claim 1, wherein a supply voltage is generated by switch controlling said first switch and said second switch and boosting an input voltage thereto to a voltage of n times or −n times the input voltage based on said power supply clocks produced by an integrated circuit using said system clock, said integrated circuit being operated using said system clock.

4. A charge pump type power supply circuit according to claim 1, further including, means for generating two boosted voltages; and means for generating the two power supply clocks to switch off the two boosted voltages at different times, whereby a power supply of a panel is switched off after a power supply for a driving circuit is switched off.

5. A charge pump type power supply circuit according to claim 1, wherein two power supply circuits are provided, an output voltage of one of the two power supply circuits is higher than an output voltage of the other of the two power supply circuits, and the control circuit first suspends a power supply clock of the other of the two power supply circuits with a lower output voltage.

6. A driving apparatus for a display device, comprising:

a driving circuit for generating a signal to allow a display section to display, said driving circuit being operated using a predetermined system clock external to the driving apparatus; and a charge pump type power supply circuit for generating a supply voltage for a display device by boosting an input voltage to a voltage n times or −n times said input voltage, said power supply circuit including a plurality of switches and a plurality of capacitors, the plurality of switches connecting a first one of the plurality of capacitors to either a second one of the plurality of capacitors or to an input voltage, wherein said driving circuit, generates two power supply clocks internal to the charge pump type power supply circuit using said system clock, the power supply clocks being provided to the plurality of switches, the generation of the two power supply clocks being suspended, one by one, in response to a power save control instruction; and said power supply circuit generates said supply voltage by switch controlling said plurality of switches based on said power supply clock.

7. A driving apparatus for a display device according to claim 6, wherein, said charge pump type power supply circuit includes means for selectively providing a power save control instruction;

said driving circuit suspends the generation of the two power supply clocks in response to the power save control instruction; and said power supply circuit suspends the generation of said supply voltage in response to the suspension of the supply of the two power supply clocks.

8. A display device having a display section and a driving apparatus for driving the display section, wherein said driving apparatus comprising:

a driving circuit for generating a signal to allow the display section to display, said driving circuit being operated using a predetermined system clock external to the driving circuit; and a charge pump type power supply circuit for generating a supply voltage for said display device by boosting an input voltage to a voltage n times or −n times the input voltage, said charge pump type power supply circuit having a plurality of switches and a plurality of capacitors, the plurality of switches connecting a first one of the plurality of capacitors to either a second one of the plurality of capacitors or to an input voltage, wherein said charge pump type power supply circuit includes means for selectively providing a power save control instruction;

said driving circuit further generates two power supply clocks provided to the plurality of switches, the power supply clock being internal to the driving circuit, using said system clock, and suspends the generation of the two power supply clocks, one by one, based on a power save control instruction; and said power supply generates said supply voltage by switch controlling said plurality of switches based on said power supply clocks and suspends the generation of said supply voltage in response to the suspension of the supply of said power supply clocks.

9. The display device of claim 8, wherein the charge pump type power supply circuit and the driving circuit are provided in a semiconductor device and the plurality of capacitors are external to and connected to the semiconductor device as outer elements.

10. The display device of claim 8, wherein said display device includes at least two charge pump type power supply circuits; the driving circuit generates a separate one of the two power supply clocks for each of the charge pump power supply circuits, and each of the two power supply clocks is suspended independently from the other one of the two power supply clocks based on the power save control instruction.

* * * * *